Dec. 17, 1968  D. L. PLETTE ETAL  3,417,254
SOLID-STATE OVERVOLTAGE PROTECTION CIRCUIT
Filed March 14, 1966  2 Sheets-Sheet 1

INVENTOR.
DAVID L. PLETTE
ROBERT R. WHITE
BY
Stanley C Corwin
THEIR ATTORNEY

Dec. 17, 1968    D. L. PLETTE ETAL    3,417,254
SOLID-STATE OVERVOLTAGE PROTECTION CIRCUIT
Filed March 14, 1966    2 Sheets-Sheet 2

INVENTOR.
DAVID L. PLETTE
ROBERT R. WHITE
BY Stanley C Corwin
THEIR ATTORNEY

United States Patent Office 3,417,254
Patented Dec. 17, 1968

3,417,254
SOLID-STATE OVERVOLTAGE PROTECTION CIRCUIT
David L. Plette and Robert R. White, Waynesboro, Va., assignors to General Electric Company, a corporation of New York
Filed Mar. 14, 1966, Ser. No. 534,123
3 Claims. (Cl. 307—29)

This application relates to a generator overvoltage protection circuit and in particular to an overvoltage protection circuit that senses the instantaneous voltage on the generator field.

Overvoltage protecting circuits are traditionally armature voltage sensing devices. This is true because the practice has been to use a voltage regulator with the generator that is a variable resistance type control. With such regulators, the voltage on the generator field is quite different from the armature voltage, and in some instances the armature voltage may be at overvoltage while the field voltage would be well within its rating. With such voltage regulators, therefore, it has not been possible to sense field voltage for overvoltage protection.

The development of fast-acting switch type or on-off voltage regulators has cleared the way for field voltage sensing overvoltage protection, and some of the problems inherent with overvoltage protection relying on armature voltage sensing may now be overcome. One problem that is inherent with a protection circuit which senses the armature or generator output voltage is the problem of selectivity. In a plural generator supply system, the armature voltage of all the generators is the same and if a fault occurs and overvoltage situation appears, all the generators may turn off unless special selection circuitry is provided. Another problem that is encountered with armature overvoltage sensing protection circuits is the need to provide circuitry to permit normal line transients without tripping the generator. Such circuitry provides transient damping in the form of inverse time delay to permit only those overvoltages which are sustained to trigger the overvoltage circuit into turning off the generator.

It is accordingly an object of this invention to provide a fast-acting overvoltage protection circuit that senses generator field voltage.

Another object is to provide an overvoltage protection circuit that when used with an on-off voltage regulator is capable of providing overvoltage protection in immediate response to the peak value of generator field voltage.

A further object of this invention is to provide an overvoltage protection circuit used with an on-off voltage regulator and a limited range load division circuit that is capable of determining which generator in a plural generator supply system at overvoltage must be shut down.

One embodiment of the overvoltage protection circuit includes a switch which is triggered on whenever a voltage proportional to the instantaneous voltage on the field of the generator exceeds a reference voltage. This switch controls another switching means such as a relay to interrupt the energization of the generator field caused by the voltage regulator. Such an overvoltage circuit may be used with a nonlinear or limited range load division circuit in a plural generator supply system and, by selecting the triggering voltage level of the switch in the overvoltage circuit to be proportional to an armature voltage above that set by the range limits of the load division circuit, selective generator shutdown is made possible.

Other advantages, the particular features and a better understanding of the present invention may be had by referral to one embodiment of the invention as shown in the drawings, in which.

Figure 1:
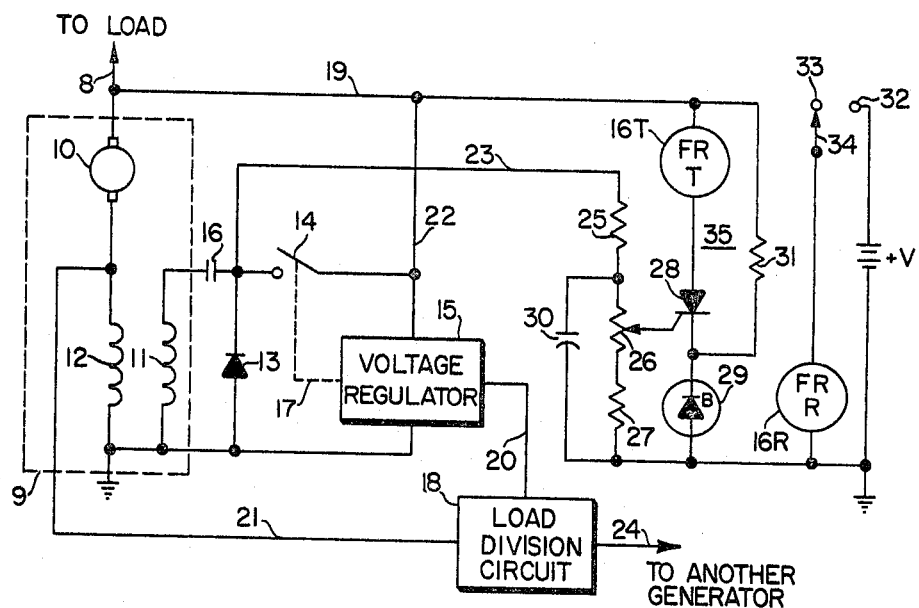
FIGURE 1 is a part block, part circuit diagram of an overvoltage protection circuit according to the invention.
Figure 3:
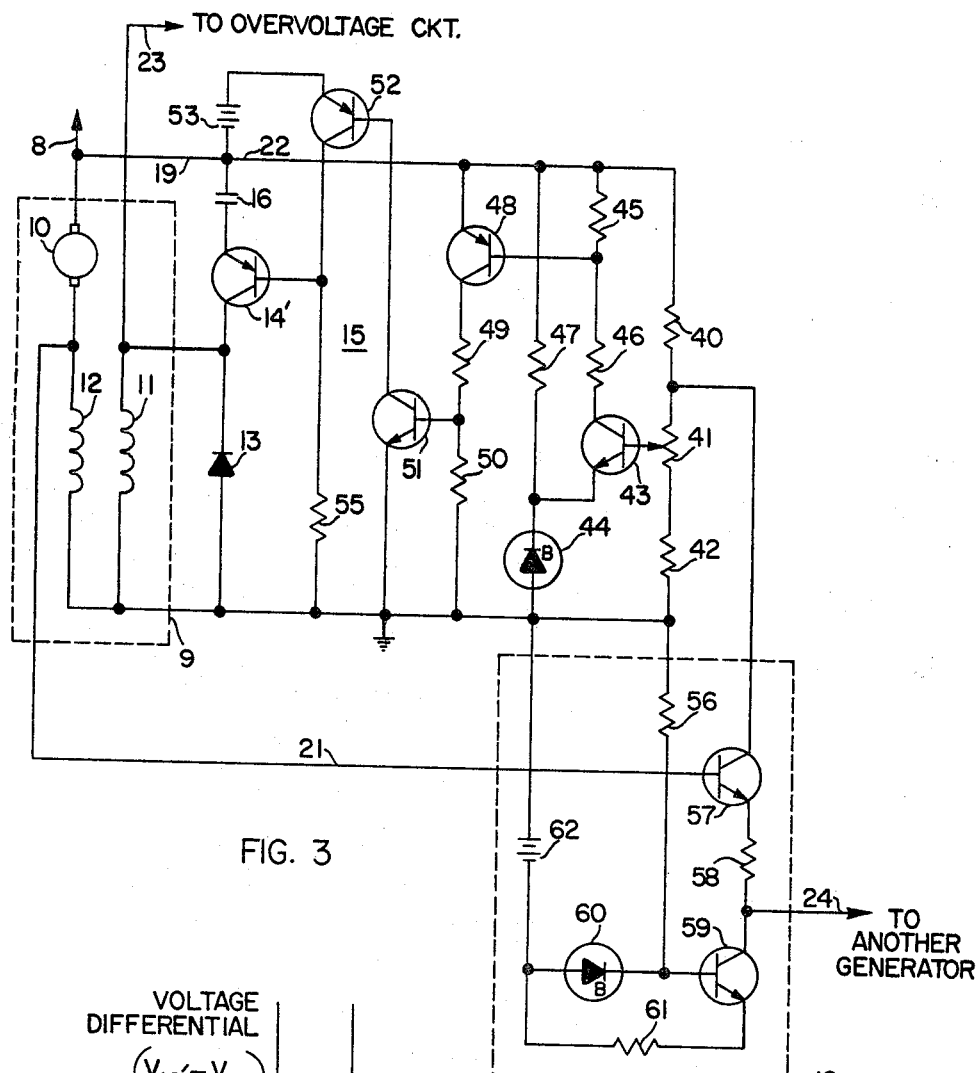
FIGURE 3 is a circuit diagram of a typical on-off voltage regulator and limited range load division circuit.

In FIGURE 1 of the drawings, wherein like reference numerals refer to like parts throughout, there is shown an overvoltage protection circuit which may be used with either a DC or an AC generator although a DC generator is shown in the dashed-line block 9 having an armature 10, a field winding 11, and a field compensating and/or commutating winding 12. The generator is shown supplying a load via line 8. The voltage regulator 15 senses the armature voltage on the line bus via conductor 19 to control a switch 14 as shown by the dashed connection line 17 between the regulator and the switch. The switch 14 together with the regulator 15 constitute an on-off voltage regulator which, as will be explained in more detail with regard to FIGURE 3, applies armature voltage to the field with the closing of switch 14 whenever the armature voltage is less than a reference voltage generated within the voltage regulator and prevents field energization by the opening of switch 14 when the armature voltage exceeds the reference voltage. To prevent arcing across the knife switch shown in FIGURE 1 or damage to a transistor switch as shown in FIGURE 3, a diode 13 is coupled across the field to permit the field current to free wheel and decay when the switch 14 is open to cause a lowering of the armature voltage during this period.

Figure 2:
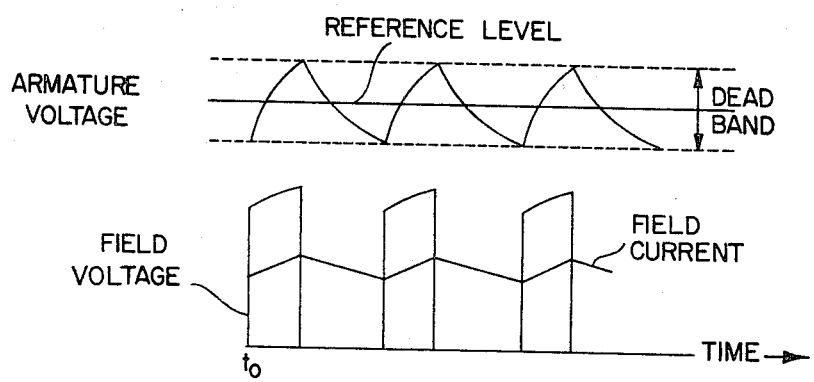
FIGURE 2 is a graph showing generator armature and field voltages.

This action of buildup and decay of armature voltage is shown in FIGURE 2 where at time $t_0$ when the armature voltage is below the reference level, the switch is closed and the field voltage immediately rises to the level of the armature voltage and then as the armature voltage exceeds the reference level, the switch 14 is opened and the armature voltage decays. At this instant the field voltage drops to zero. The field current, at the time of the switch being opened, decays much the same as that shown for the armature voltage.

FIGURE 1 also shows a load division circuit 18 which is coupled both to the compensating winding 12 of the generator 9 by the lead 21 and to the voltage regulator 15 via conductor 20. The load division circuit is shown coupled to another generator by lead 24 and as such serves to point up that the load division circuit is used only where more than one generator supplies the load. The connection of the load division circuit to the generator compensating winding 12 provides a means for sensing the armature current supplied by this generator. A counterpart of the load division circuit is associated with each generator in the system. The purpose of the load division circuit is to insure that each of the generators shares equally in supplying the current to the load. Further details of this circuit are presented with reference to FIGURE 3.

The overvoltage protection circuit 35, shown in FIGURE 1, includes a voltage divider consisting of resistors 25, 26 and 27 which serves to sense and establish a voltage proportional to the voltage instantaneously appearing on the field 11 of the generator 9. The field and the voltage divider are connected by conductor 23. It is noted that one of the resistors such as 26 of the voltage divider may be variable so as to more accurately determine the point at which the silicon controlled rectifier switch 28, to which the variable resistor is connected, is triggered on. A capacitor 30 coupled across the field voltage sensing divider prevents SCR 28 from triggering when spurious noise appears on the generator field. This capacitor is low in value, sufficient only to filter out such noise.

Zener diode 29, connected to the cathode of the silicon controlled rectifier switch 28, establishes a reference triggering level which, when the voltage at the gate of the SCR developed by the voltage divider exceeds the reference level, causes the SCR to be turned on. Resistor 31 couples the reverse breakdown diode to a source of supply such as bus 19 to energize this device. The triggering level for this overvoltage protection circuit established by Zener diode 29 is selected to cause the SCR to be turned on when the armature voltage of generator 9, as indicated by the voltage on its field, exceeds by a predetermined amount the limit set by the reference level of the voltage regulator even when adjusted by the load division circuit. The turning on of switch 28 at an overvoltage condition serves to break the connection between the generator armature and its field which is periodically made by the voltage regulator 15. To this end, field relay 16 is activated, the trigger coil 16T of this relay being coupled in the anode-cathode path of the SCR. The normally closed contacts 16 of the relay, which is preferably a magnetically latched relay, shown coupling the generator armature to its field, are now opened and remain open until reset by the energization of the field relay reset coil 16R. The relay is reset at a time when the armature voltage has dropped below the level set by Zener diode 29 so that the SCR is reverse biased and turned off. The field relay reset coil may be energized by momentarily moving the switch 34 from a neutral contact 33 to contact 32 which is connected to a battery or other power source +V.

FIGURE 3 shows both a typical voltage regulator and a load division circuit which is set off by the dashed-line block 18. These are representative of circuits which may be used with the overvoltage circuit of the present invention. Several elements of the system are shown again in this figure for the purpose of continuity between the figures. Such elements are the generator armature 10, with field winding 11, compensating and/or commutating winding 12 and the protective diode 13. As in FIGURE 1, conductor 19 is shown coupled to conductor 22 to connect the armature 10 to a voltage divider sensing means within the voltage regulator. This voltage divider consists of resistor 40, variable resistor 41 and resistor 42. The voltage developed at the wiper arm of resistor 41 is thus proportional to the armature voltage and is applied at the base of transistor 43 to turn this transistor on whenever this voltage exceeds the reference voltage established by Zener diode 44, connected between the emitter of this transistor and ground. Resistor 47 couples the Zener diode to conductor 22 to energize this breakdown diode. When the potential on the wiper of potentiometer 41 exceeds the reference level by an amount equal to the emitter-base diode voltage drop of transistor 43, this device conducts causing the voltage at the junction between collector resistors 45 and 46 of transistor 43 to drop, thereby lowering the voltage at the base of PNP transistor 48 to turn this transistor on. The base of transistor 51 is now connected to a source of positive potential via a voltage divider consisting of resistors 49 and 50 so that this transistor is turned on. With transistor 51 conducting, the base of transistor 52 is coupled directly to ground and this PNP transistor is turned on to cause a voltage source 53 that is positive with respect to the armature voltage to be applied to the base of the transistor switch 14' to back bias the emitter-base diode of this transistor insuring that this switch is turned off. Transistor switch 14', the counterpart of the knife switch 14 in FIGURE 1, now no longer connects the armature of the generator, to which the emitter of transistor 14' is connected, to the field 11 of the generator, to which the collector of this transistor is connected. Resistor 55 serves as a path for collector current to flow in the transistor 52 and also as means to bias transistor 14'.

A quick glance at the circuit of the voltage regulator shown in FIGURE 3 relates that transistors 48, 51 and 52 merely act as an amplifying stage for applying the trigger signal developed by transistor 43 to the transistor 14'. When the armature voltage drops due to the lack of energization of the field 11, the voltage on the wiper of variable resistor 41 will lower and when this voltage is less than the reference level established by the Zener diode, transistor 43 will cease to conduct as will transistors 48, 51 and 52, causing the removal of the positive bias at the base of switch 14' and this transistor will resume conduction, again connecting the armature voltage at 19 to the field 11.

It will be recognized that Zener diode 44, shown in the emitter circuit of transistor 43 in FIGURE 3, and the voltage divider consisting of resistors 40, 41 and 42 sets the normal operating voltage level for the generator, this level being shown in FIGURE 2 in relation to the variations of armature voltage in what is designated the deadband of voltage regulation.

It is noted that the contacts of the field relay 16, controlled by the overvoltage protection circuit, are shown in the emitter path of transisor switch 14'. The relay switch serves the same purpose as has been previously described. FIGURE 3 also shows the conductor 23 coupling the field to the overvoltage protection circuit as is shown in FIGURE 1.

The dashed block 18 in FIGURE 3 shows a load division circuit which is typical of circuits which may be used with the overvoltage protection circuit of the present invention. The load division circuit is in reality one-half of a differential amplifier, the other identical half being part of the circuitry associated with another generator. Connector 24 thus couples to the mirror image of transistor 59 and to the same end of a resistor which may be designated 58' in the load division circuit of the other generator. What is shown in block 18 is thus really one-half of a load division circuit. It is noted that where there are *n* generators used, each load division circuit would couple to *n*—1 others identical in circuitry to that shown in FIGURE 3.

There is shown in the dashed block 18 a constant current generator, or drain as it is used, consisting of the Zener diode 60, transistor 59 and resistor 61. DC supply 62 and resistor 56 form a bias supply for the Zener diode 60. The voltage established by the Zener diode substantially appears across emitter resistor 61 to determine the amount of current that can be conducted by transistor 59. This constant current drain is coupled to the voltage divider consisting of resistors 40, 41 and 42 of the voltage regulator by a conductor 20, a transistor 57 and resistor 58. The degree of coupling or the amount of conduction through this path being controlled by the transistor 57 which is coupled to generator winding 12 by conductor 21.

To understand the operation of the load division circuit, let it be assumed that there is a generator 10' also supplying current to the load via conductor 8, that this generator is associated with a voltage regulator similar to voltage regulator 15 and also a load division circuit 18' identical in every respect to that shown in FIGURE 3. If generator 10' is supplying more current to the load than generator 10, the winding 12' of this generator will establish a greater voltage drop than that developed by the winding 12, and as a result, the voltage at transistor 57' will be less positive than the voltage at transistor 57 or, in other words, the base of transistor 57 will be more positive than the base of transistor 57'. Transistor 57 thereby conducts harder than its counterpart and a greater voltage drop will be realized across resistor 40, thus lowering the voltage appearing at the base of transistor 43 and holding this transistor off which holds transistor 14' on to energize the field of generator 9 until the armature voltage is raised sufficiently to overcome the drain on the voltage divider-sensing circuit. The current drain on the voltage divider of the regulator effects a recalibration of the reference established by the voltage regulator since a higher armature voltage is required to turn on transistor 43. If there is no limit placed on this recalibration process, it would continue so long as there is an unbalance between the amount of load supplied by each of the generators and until the overvoltage protection circuit trigger level is reached and the generator is shut down.

It should be understood that if the on-off voltage regulator is functioning properly, the overvoltage protection circuit will not trigger. This is because the energization of the generator is cut off by the regulator whenever the armature voltage exceeds the reference level and because this reference level is lower than the level of armature voltage at which the overvoltage circuit triggers. However, if the load division circuit recalibrates the reference level until it approaches the triggering level of the overvoltage protection circuit, this unfaulty generator will be shut down. This points up the need for limiting the range of operation of the load division circuit. The constant current load on transistor 57 prevents the current drain from the voltage divider of the regulator from exceeding a prescribed limit. This limit, of course, is set to represent an armature voltage less than the triggering level of the overvoltage circuit.

By limiting the range of the load division circuit selectivity of overvoltage protection is made possible. When one voltage regulator in a plural generator system malfunctions causing an unbalance in the load supplied by the generators, each properly operating voltage regulator will disconnect the armature to field coupling of its generator after the limit of reference level recalibration caused by the load division circuit has been reached. The overvoltage circuits associated with these properly operating voltage regulators will sense no voltage on the generator field and will not trigger. Thus, there is overvoltage selectivity in that only the overvoltage protection circuit associated with the faulty voltage regulator is activated to shut down its generator.

Figure 4:
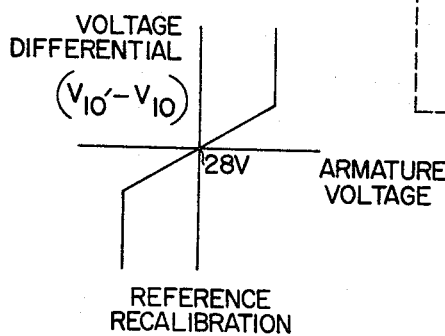
FIGURE 4 is a voltage plot of the characteristic of the limited range load division circuit.

FIGURE 4 shows a plot of the curve of reference recalibration for varying differences of generator voltage about the reference level set by the voltage generator. A reference level of 28 volts is shown at the origin, a typical armature voltage desired for DC generators. The curve in this figure shows that within the limits set by the constant current drain, the reference recalibration is linear.

While a particular voltage regulator and load division circuit has been described, it is to be understood that it is only the function performed by each of these circuits, i.e., on-off voltage regulation and limited range load division, that is essential to the working of the overvoltage protection circuit and the particular voltage regulator or load division circuit used is not necessary to the successful operation of the overvoltage protection circuit.

It should also be noted that while a relay has been shown as the means for disrupting the coupling between the armature and the field of the generator in an overvoltage condition, other means to interrupt this coupling such as a transistor or other switching means could readily be substituted.

While the drawings show a DC generator, the overvoltage protection circuit of the present invention is also applicable to AC generators where the armature voltage is rectified and used to excite the field. Since various changes and modifications may be made in the practice of the invention herein described without departing from the spirit or scope thereof, it is intended that the foregoing description shall be taken primarily by way of illustration and not in limitation except as may be required by the appended claims.

What is claimed and desired to be secured by Letters Patent of the United States is:

1. An overvoltage protection circuit for a generator having an on-off voltage regulator which couples generator armature voltage to the generator field when said armature voltage is less than a reference voltage established by said voltage regulator and interrupts this connection when said armature voltage exceeds said reference voltage, said overvoltage protection circuit comprising sensing means coupled to sense the instantaneous voltage on said generator field and develop a voltage proportional thereto, means for establishing a switch triggering voltage level proportional to an armature voltage which exceeds the armature voltage level established by the reference voltage of said voltage generator, switch means responsive to the sensing voltage and said triggering voltage level, said switch means being triggered on whenever said sensing voltage exceeds said triggering voltage level, and means controlled by said switch means to interrupt the coupling between the armature of said generator and its field whenever said switch means is on.

2. An overvoltage protection circuit as recited in claim 1 wherein said means controlled by said switch means is a relay, the coil of which is coupled in a series circuit with said switch means.

3. An overvoltage protection circuit for each generator in a plural generator supply system, wherein each generator has an on-off voltage regulator coupling the line voltage to the generator field when the line voltage is less than a reference voltage established by said voltage regulator and interrupting this connection when said line voltage exceeds said reference voltage, and a load division circuit to equalize the outputs of the plurality of generators by adjusting said reference voltage within predetermined limits, said overvoltage protection circuit comprising sensing means coupled to sense the instantaneous voltage on said generator field and develop a voltage proportional thereto, means for establishing a switch triggering voltage level proportional to a line voltage which exceeds the line voltage level established by the adjusted reference voltage of said voltage regulator, switch means responsive to the sensing voltage and said triggering voltage level, said switch means being triggered on whenever said sensing voltage exceeds said triggering voltage level, and means controlled by said switch means to interrupt the coupling between the armature of said generator and its field whenever said switch means is on, whereby only a generator whose field indicates an overvoltage is turned off.

References Cited

UNITED STATES PATENTS 2,885,569   5/1959   Schuh et al. _____ 307—29 X
3,271,580   9/1966   Pope _____ 307—29

ROBERT K. SCHAEFER, *Primary Examiner.*

H. J. HOHAUSER, *Assistant Examiner.*